United States Patent [19]

Nagel

[11] Patent Number: 4,541,527

[45] Date of Patent: Sep. 17, 1985

[54] STORAGE BOX WITH SNAP OPENING LID AND STAND

[76] Inventor: Robert C. Nagel, 7131 Cambria Cir., Orange, Calif. 92669

[21] Appl. No.: 659,244

[22] Filed: Oct. 10, 1984

[51] Int. Cl.[4] .................. B65D 85/57; B65D 25/20
[52] U.S. Cl. .................. 206/45.24; 206/425; 206/444; 206/809; 206/265
[58] Field of Search .............. 206/425, 444, 311, 37, 206/265, 809, 45.24, 45.27

[56] References Cited

U.S. PATENT DOCUMENTS

| | | | |
|---|---|---|---|
| 1,173,388 | 2/1916 | Rosenberg | 206/37 |
| 1,483,289 | 2/1924 | Doering et al. | 206/45.27 |
| 1,574,566 | 2/1926 | Fiske | 206/265 |
| 1,720,274 | 7/1929 | Holden | 206/809 |
| 1,825,332 | 9/1931 | Benbow | 206/45.24 |
| 1,997,043 | 4/1935 | Clark | 206/265 |
| 3,575,284 | 4/1971 | Holt | 206/45.24 |
| 4,225,038 | 9/1980 | Egly | 206/45.18 |
| 4,356,918 | 11/1982 | Kahle | 206/444 |

FOREIGN PATENT DOCUMENTS 164809 2/1905 Fed. Rep. of Germany.
1081054 7/1953 France.

*Primary Examiner*—William T. Dixson, Jr.
*Attorney, Agent, or Firm*—King, Liles & Schickli

[57] ABSTRACT

A storage box is provided for holding and displaying diskettes including a container portion, a lid portion joined by a living hinge to the container portion and a U-shaped linkage member pivotally interconnecting said container and lid portions to form a combined latch and stand for the box. The hinge is flexible and provides the tension necessary for the snap action movement during the opening and closing of the lid portion. In the closed position, the hinge is under tension to provide a seal. When the lid portion is held in the open position, the U-shaped linkage member forms a stand for the box. Preferably, the geometry of the linkage member is selected to position the container portion at an angle of substantially 45 degrees to the horizontal for display of the diskettes for easy access.

10 Claims, 7 Drawing Figures

U.S. Patent  Sep. 17, 1985  Sheet 1 of 2  4,541,527
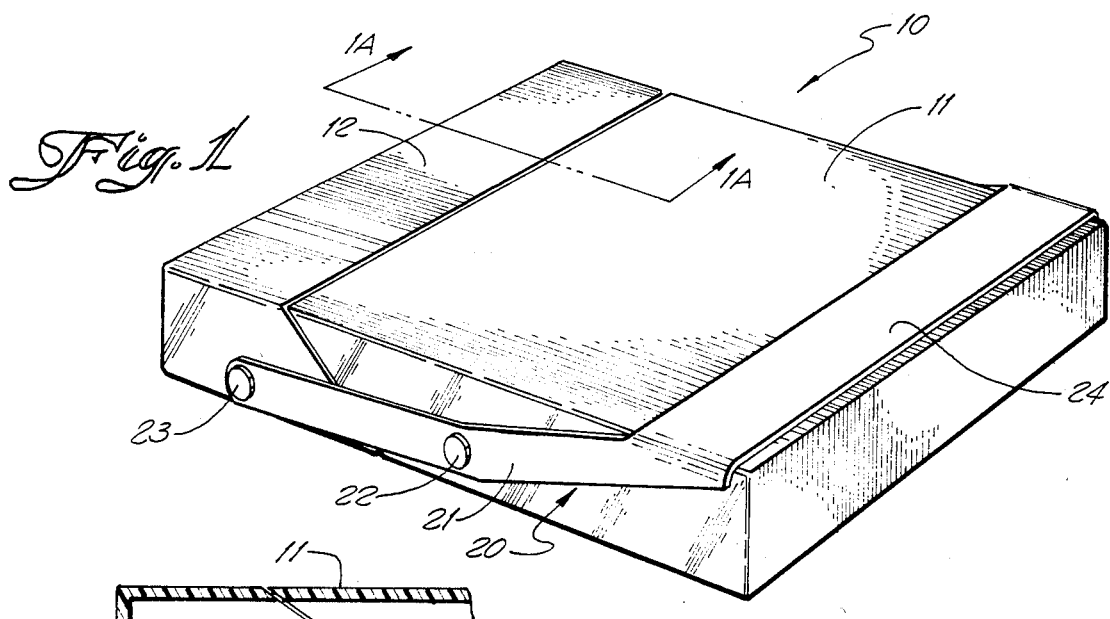
Fig. 1
Fig. 1A
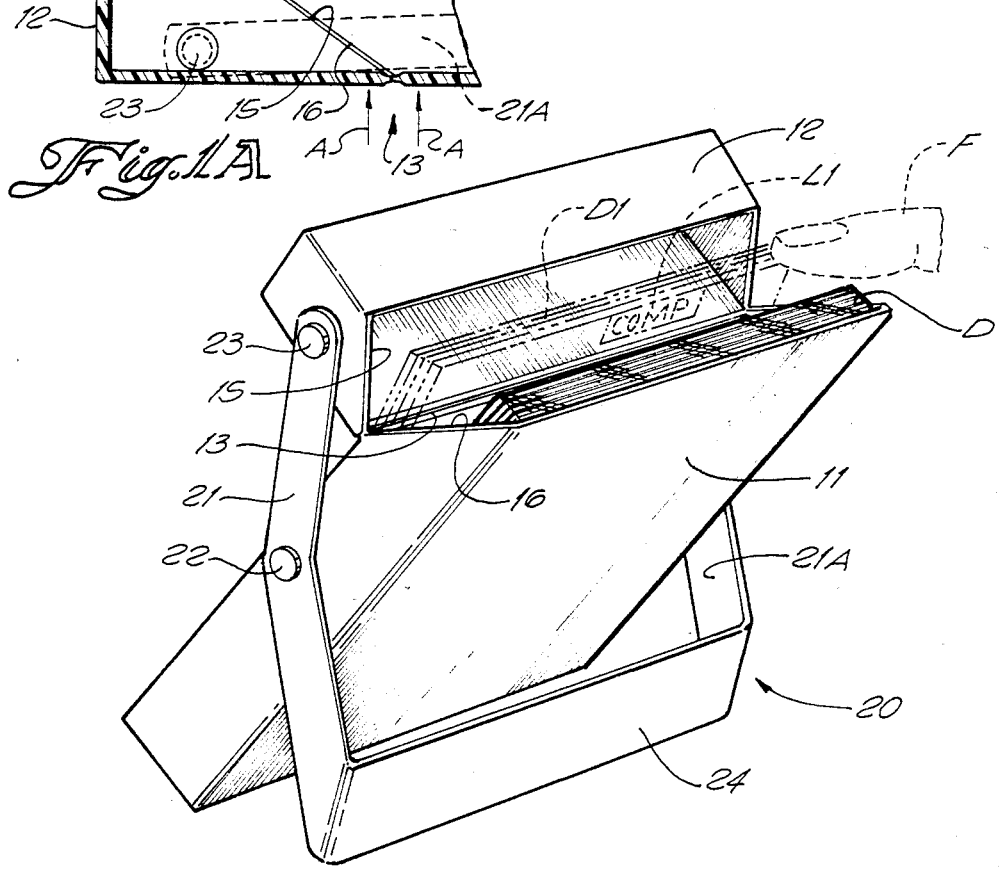
Fig. 2

STORAGE BOX WITH SNAP OPENING LID AND STAND

BACKGROUND OF THE INVENTION

The present invention relates to specialized storage boxes, and more particularly to a box for storing computer diskettes having an easy operating pivotal lid and display stand.

With the growing popularity of personal computers and the proliferation of computer programs to operate the computers, there has been a growing need for portable storage containers for the diskettes. It is desirable to have a container that is not only easy to open, but it also adapted for positioning at a convenient angle to search through the diskettes for the one desired.

In the prior art, there are several containers having desirable features specifically adapted for storing of diskettes. For example, the Egly U.S. Pat. No. 4,225,038, issued Sept. 30, 1980, discloses a diskette storage case having a separate internal rack to support the diskettes when the case is opened. The case is designed having one complete side of the case hinged for opening movement.

Other proposals for combined storage containers and display racks are shown in the patented art. The Kahle, et al. U.S. Pat. No.4,356,918, issued Nov. 2, 1982 is typical of this type of construction. The container has a pivoted rack for holding the diskettes with the opening movement being provided by a 270-degree plus rotation of the rack to the open position. In this type of arrangement, the container forms a supporting structure for the rack with the diskettes positioned for viewing.

Another approach is to provide a container with a lid attached to pivoting arms, with the lid serving to support the container in an upright position, as shown in the Fiske U.S. Pat. No. 1,574,566, issued Feb. 23, 1926.

In all of the known prior art, the containers normally rely on detent-type devices for holding the container together in the closed position. For example, the Egly '038 and Kahle, et al. '918 patents have integral detent slots/beads to snap the lid into the closed position. In the raised or open position, the component parts of the container are left without a positive locking arrangement. In the earlier Fiske patent '566, no locking or latching arrangement is disclosed for either position.

It is desirable to have a simple, inexpensively manufactured device that will provide snap opening operation of a storage box and at the same time include an arrangement wherein the lid will be positively retained in either the opened or closed position. It is also desirable to make the container as simple as possible for operation, as well as for being economical and easy to manufacture.

SUMMARY OF THE INVENTION

Accordingly, it is a primary object of the present invention to provide an improved storage box for computer diskettes or the like having an easy opening, but positive latching lid and stand.

It is another object of the present invention to provide a diskette storage box providing positive opening and closing of the lid by a simple linkage member.

It is still another object of the present invention to provide a storage box having a U-shaped linkage member interconnecting the container portion and lid portion of a storage box providing over-center, snap opening and closing action.

Still another object of the present invention is to provide a storage box having a U-shaped linkage member interconnecting the container and the lid providing snap closing of the lid and a secure stand for the container when the lid is opened.

It is still a further object of the present invention to provide a storage box for diskettes in which the container portion and the lid portion are connected by a living hinge and a U-shaped linkage member with the living hinge providing flexibility to allow over-center travel and snap opening and closing of the lid.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved storage box for holding and displaying diskettes is provided by a container portion for the diskettes, a lid portion for closing the box, hinged means for connecting the portions and a combined latching and stand means pivotally interconnecting the two portions. The hinged means is flexible so as to allow bending of the container thereby providing positive latching action in a closed position for storage. In the open position, a stand for the box is provided allowing the convenient display of the diskettes. Of course, while the box is disclosed primarily for holding diskettes, other uses can be made of the box, such as for holding other small articles where access is important. Such items as written document cards, such as recipes, or small discrete articles, such as colored pens, can be packaged and stored in the box of the present invention.

Preferably, the combined latching and stand means is in the form of a U-shaped linkage member. The spaced, parallel arms are connected at the ends adjacent the container portion by a cross-member. The arms are connected by first and second pairs of pivot pins connected to corresponding side walls of the container portion and the lid portion.

The invention is further characterized by each pair of pivot pins being sufficiently close to each other across the hinge to provide over-center snap closing and opening action. The snap closing action provides good protection against entry of dust thus maintaining the diskettes in top operating condition. In the open position, the U-shaped linkage supports the box in a positive manner. In particular, as the lid portion is opened, the pins on the lid portion move over-center with respect to the line passing through the center of the hinge and the pins on the container portion. As the lid portion traverses the over-center point, the integral living hinge of the box flexes to provide the resilient snapping action. If the lid portion is being moved toward the closed position, the lid is advantageously snapped into the closed position. The hinge remains partially flexed in the closed position so that there is a snug seal between the lid portion and the container portion. Similarly, the lid portion snaps to the open position but comes to rest in a neutral position. The neutral position keeps the lid portion from going in either direction. A fixed triangle between the pair of pins and the hinge on each side in the open position form a geometrically secure arrangement for keeping the lid open. The optimum position of the U-shaped linkage member is such as to present the container portion at an angle of approximately 45 degrees to the horizontal. This provides for easy access to the diskettes so that the labels on the upper edge can be reviewed for identification. When the storage box is ready to be closed, the cross member of the U-shaped linkage member may be simply manually depressed toward the front wall of the container portion thus moving the lid portion to the closed position.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention. In the drawings:

FIG. 1 is a perspective view of the storage box of the invention shown in a closed condition;

FIG. 1A is an enlarged, partial cross-sectional view through the hinge of the box of FIG. 1 along line 1A—1A;

FIG. 2 is a perspective view of the storage box of the invention shown in the open and display mode;

DETAILED DESCRIPTION OF THE INVENTION

Figure 4:
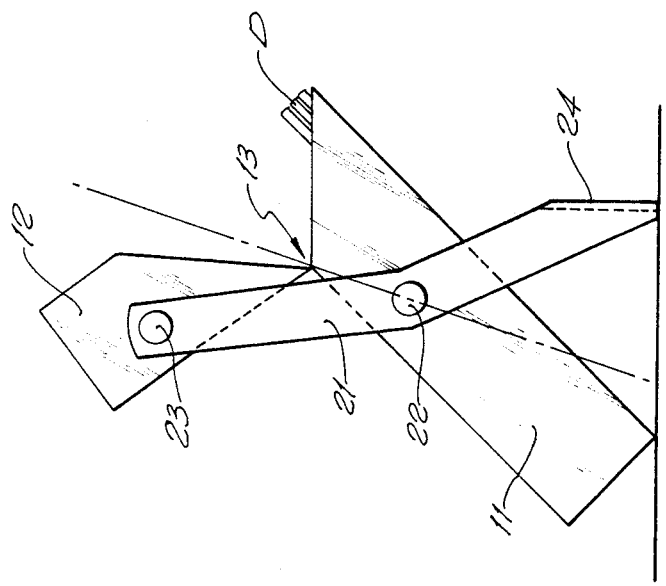
FIG. 4 is a side view of the storage box with the lid fully opened and the stand positioned for display of the contents of the box.

Reference is now made to FIG. 1 wherein is shown a storage box 10 for holding diskettes or the like, with the box 10 being shown in the closed position. The box includes a container or body portion 11 and a lid portion 12 hinged by a reduced area, living hinge 13. As shown in the drawings, the container portion 11 includes a front wall, two side walls (one side wall showing in FIG. 1) and a bottom wall. Opposite the front wall is, of course, a back wall, thus completing the construction of the container portion. Similarly, the lid portion includes a front wall and an opposite back wall, two (2) side walls and a top wall. The lid portion 12 includes an angled sealing lip 15 that cooperates with the upper edge 16 of the container portion 11. As shown particularly in FIG. 1A, the sealing lip 15 snugly engages the upper edge 16 to form an effective dust seal for the contents of the storage box 10.

In addition to being connected by the living hinge 13, the container and lid portions 11, 12 are pivotally interconnected by a U-shaped linkage member 20 forming a combined latching and stand means for the box 10. The linkage member 20 includes a pair of substantially parallel arms extending along the side walls of the box 10. The arm 21 is shown attached to the side walls of the container and lid portions 11, 12 by a pair of suitable headed pivot pins 22, 23. A cross-member 24 extends between the ends of the arms 21, 21a (see FIG. 2). When in the open position as shown in FIG. 2, the cross member 24 maintains the container in an upright position to allow easy access to the diskettes. Of course, although not shown in the drawings, it is clear that the manner in which the arm 21a is attached to the container and lid portions 11, 12 is not shown, it is the same as on the side that is shown in the drawings. In FIG. 1A, the arm 21a is shown in phantom with the head of the pivot pin 23 on the inside of the lid 12 being shown.

From the foregoing, it can be readily realized that the storage box of the present invention is simple in construction and economic to fabricate. The box 10 is advantageously held in the closed position by the U-shaped linkage member 20, as will be more readily apparent in the discussion below. This protects the diskettes within the box in a highly efficient manner. When the operator of the computer is ready to use diskettes, such as diskettes D (FIG. 2), the storage box can be easily opened by simply pushing back on the lid 12 and/or lifting up on the cross member 24. As can be seen in FIG. 2, the storage box is in a favorable tilted position with diskettes D being stored and protected. When commencing a project on a personal computer, the operator simply moves the finger F over to the edge so as to push the diskettes into the back of the container portion (note the phantom line diskettes $D_1$ shown in FIG. 2). It is clear that the label L along the diskettes can be easily viewed for selection of the proper diskette.

Figure 3C:
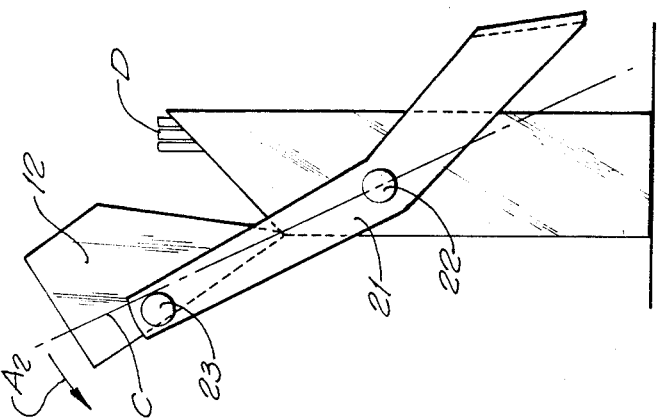
FIG. 3C is another side view showing the lid portion opened sufficiently to pass over-center and urged toward the full open position.
Figure 3B:
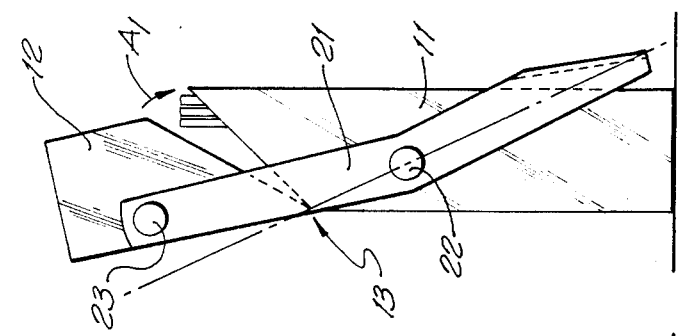
FIG. 3B is a side view of the storage box showing the lid partially opened and urged by the flexure of the hinge toward the closed position.
Figure 3A:
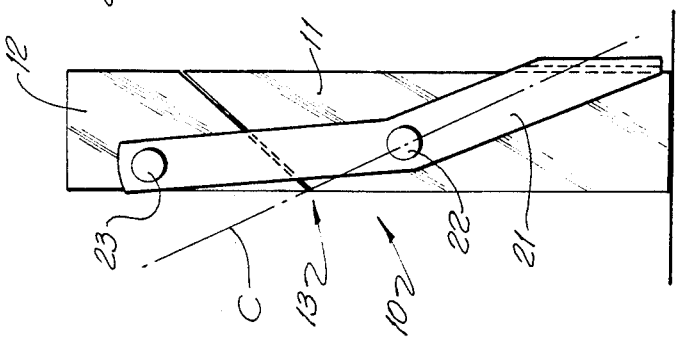
FIG. 3A is a side view of the storage box showing the lid in the closed position.

Proceeding to describe the important over-center type latching action of the storage box 10, reference is now made to FIGS. 3A–3C. In FIG. 3A, the box 10 is illustrated in the closed position from the side. A center line C extends through the pivot pin 22 and the living hinge 13. This puts the pin 23 on the right hand side of the center line and the lid portion 12 is shown snugly engaging the container portion 11.

As the lid portion 12 is pivoted about the living hinge 13 to effectively force the box 10 toward the open position, the hinge 13 flexes inwardly as shown by the action arrows A in FIG. 1A. The reason for this flexing action of the hinge 13 can best be seen in FIG. 3B wherein the lid portion 12 is being lifted away from the container portion 11 and thus tending to increase the distance between the pins 22, 23. Because the arm 21 is relatively inflexible, this action must result in flexing of the hinge 13 thus tending to constantly urge the lid portion 12 toward the closed position (see arrow $A_1$ in FIG. 3B).

As the force opening the lid portion 12 is continued to be applied in FIG. 3C, the pin 23 is eventually moved to the point where the pin 23 passes over the center line C. At this point, the force built up in the flexing of the hinge 13 is released and the lid portion 12 is urged in the direction of the arrow $A_2$ toward the full open position. This over-center snap action is very desirable in the storage box 10 of the present invention since the lid portion 12 is automatically latched and maintained in either the full open or full closed position, as is desired.

In the closed position, the hinge 13 remains slightly bowed or flexed inwardly (see arrows A in FIG. 1A) so that the lip 15 of the lid 12 is urged into snug sealing relationship with the upper edge 16 of the container portion 11. In this way, the box 10 effectively seals against entry of dust that would otherwise contaminate the diskettes D.

On the other hand, when the lid portion 12 is in the full open position, as shown in FIG. 4, the flexure in the hinge 13 is released. In this position, the arms 21, 21a latch in a steady, neutral position since movement of the pivot 23 in either direction would tend to flex the hinge 13 and provide a buildup of tension. Thus, the box 10 can be advantageously latched in the open and display mode resting on one edge of the container portion 11 and the cross member 24, as clearly shown in FIGS. 2 and 4. The preferred angle of tilt of the container portion 11 is approximately 45 degrees, as shown in FIG. 4; however, it is to be understood that within the broadest aspects of the present invention an angle between 30 and 60 degrees with respect to the horizontal may be employed. In any case, the diskettes D can be easily flipped for searching from the dotted line position to the front of the box (see diskettes D₁, as shown and described with respect to FIG. 2).

In summary, it can be seen that the storage box 10 of the present invention provides numerous benefits and attains the objectives set forth above. The box is simple in design and easy to manufacture. The lid portion 12 is automatically latched in the closed or open position by a unique U-shaped linkage member 20. The over-center action provided by positioning of the pivot pins 22, 23 ensures that the box is substantially dust free in the closed position and is steady in the open and display mode. The diskettes can be easily viewed during use for easy access.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. It is intended that the scope of the invention be defined by the claims appended hereto.

I claim:

1. A storage box for holding and displaying diskettes or the like, comprising:
   a container portion having a front wall, a back wall, first and second side walls and a bottom wall for holding the diskettes;
   a lid portion having a front wall, a back wall, first and second side walls and a top wall corresponding to the walls of the container portion;
   hinge means connecting said container and lid portions; and
   combined latch and stand means pivotally interconnecting said container and lid portions; said latch and stand means cooperating with said hinge means to provide positive latching action in a closed position for storage and a stand supported open position for the display of diskettes for easy access.

2. The storage box of claim 1, wherein said hinge means is a flexible living hinge provided along adjacent edges of the back walls of said container and lid portions.

3. The storage box of claim 1, wherein said latching and stand means is a substantially U-shaped linkage member.

4. The storage box of claim 3, wherein said U-shaped linkage member includes first and second spaced, substantially parallel arms connected together by a cross member.

5. The storage box of claim 4, wherein said first arm is pivotally connected to said first side walls of said container and lid portions and said second arm is pivotally connected to said second side walls of said container and lid portions opposite said first side walls.

6. The storage box of claim 5, wherein the pivotal connection is by means of first and second pairs of pivot pins connected to said side walls.

7. The storage box of claim 6, wherein each pair of pivot pins are positioned sufficiently close to each other across said hinge means to provide over-center snap closing and opening action to the lid portion.

8. The storage box of claim 7, wherein said pins on said lid portion move over the line passing through the center of said hinge means and the pins on the container portion, when said arms are moved between the positions.

9. The storage box of claim 4, wherein said cross member is positioned adjacent to said front wall of said container portion when said lid is in the closed position, the flexibility of said hinge means being sufficient to hold said lid in the closed position.

10. The storage box of claim 4, wherein said cross member supports said container portion at an angle of approximately 45 degrees to the horizontal for the display of diskettes when in said open position.

* * * * *